(Specimens.)

J. HALEY.
GLASS TILE AND PROCESS OF MAKING THE SAME.

No. 331,395. Patented Dec. 1, 1885.

Attest
Chas. F. Day
C. E. Curtis

Inventor
Jonathan Haley
by Bradford Howland
Attorney

United States Patent Office.

JONATHAN HALEY, OF RAVENNA, OHIO.

GLASS TILE AND PROCESS OF MAKING THE SAME.

SPECIFICATION forming part of Letters Patent No. 331,395, dated December 1, 1885.

Application filed February 11, 1885. Serial No. 155,655. (Specimens.)

*To all whom it may concern:*

Be it known that I, JONATHAN HALEY, a citizen of the United States, residing at Ravenna, in the county of Portage and State of Ohio, have invented a new and useful Improvement in Glass Tiles and the Process of Making the Same, of which the following is a specification.

The tiles herein described are adapted for floors, mantels, and other purposes where ornamental glass plates may be used to advantage.

Figure 1:
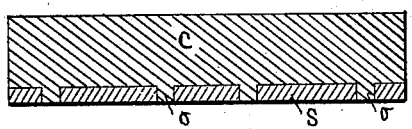
Figure 2:
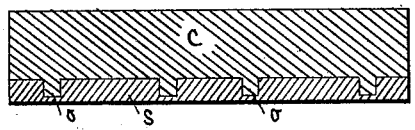
Figure 3:
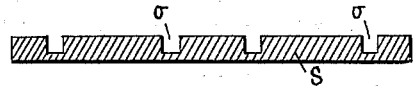

In the drawings forming a part of this specification, Figure 1 is a cross-section of the glass tile, which is composed of the two layers or plates *c s*, united by being pressed together in a mold, and then finished by grinding one side, as hereinafter described. Fig. 2 represents a cross-section of the tile before being finished by grinding, and Fig. 3 is a like section of the molded plate *s*.

The upper part or layer, *c*, is of a different color from the lower part, *s*.

My newly-invented process for making glass tile is as follows: Plate *s* is formed by pressing molten glass of any desired color in a suitable mold, to give it the required shape, and to form in it ornamental figures *o* of such depth as to extend nearly through the plate. The plate *s* should be thin. I prefer to make it about three-sixteenths of an inch thick, and to press the figures into it about an eighth of an inch or more. The figures or indentations in the glass are made by like figures raised on the bottom of the plunger. When plate *s* has been thus formed, and while it is still hot in the mold, but not too soft to retain its shape, molten glass of another color, to form plate or layer *c*, is pressed on the top of plate *s* and into its figures *o* by the same plunger, or, if desired, by one with a smooth or even bottom. After the two parts *c s* have been thus united, and have been removed from the mold, the bottom of plate *s* (which is to be the top or ornamental side of the tile when in use) is to be ground off until the different-colored glass of part *c* is reached and the ornamental figures *o*, which should be of even depth, appear to the eye.

In the term "glass tile," as used herein, I wish to be understood as including all similar glass articles for any purpose that can be made by the process herein described.

I claim as my invention—

1. As an article of manufacture, a glass tile formed with two parts or layers of different-colored glass united by pressure while heated, one of the parts being formed with ornamental indented figures which are filled by the other part, and the side of the tile being ground off to exhibit the ornamental configuration, substantially as described.

2. The process of making glass tiles, consisting of the following steps: first, pressing molten glass into the form of a thin plate with indented ornamental figures; second, pressing molten glass of a different color on said plate and into said figures, and thereby forming a plate or tile of the two united parts; and, third, grinding off the bottom of the first-mentioned plate to expose the glass of different color composing the ornamental figure, substantially as described.

JONATHAN HALEY.

Attest:
 LUTHER DAY,
 CHAS. F. DAY.